United States Patent
Lambarth et al.

(10) Patent No.: US 7,887,113 B2
(45) Date of Patent: Feb. 15, 2011

(54) POWERED PATIENT SUPPORT AND FASTENING SYSTEM WITH INDUCTIVE BASED POWER SYSTEM

(75) Inventors: Cliff Lambarth, Portage, MI (US); Chad Souke, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 345 days.

(21) Appl. No.: 12/145,037

(22) Filed: Jun. 24, 2008

(65) Prior Publication Data

US 2009/0015027 A1 Jan. 15, 2009

Related U.S. Application Data

(60) Provisional application No. 60/949,005, filed on Jul. 11, 2007.

(51) Int. Cl.
*A16G 1/02* (2006.01)
(52) U.S. Cl. ...................................................... 296/20
(58) Field of Classification Search .................. 296/20, 296/19; 307/66, 104; 362/183; 320/107, 320/108, 137
See application file for complete search history.

(56) References Cited

U.S. PATENT DOCUMENTS

| 2,456,024 | A | * | 12/1948 | Schofield | 296/19 |
| 4,052,097 | A | * | 10/1977 | Weil et al. | 296/20 |
| 4,097,941 | A | * | 7/1978 | Merkel | 296/20 |
| 4,273,374 | A | * | 6/1981 | Portman | 296/19 |
| 4,584,989 | A | * | 4/1986 | Stith | 296/20 |
| 5,279,011 | A | | 1/1994 | Schnelle | |
| 5,615,848 | A | * | 4/1997 | Ceriani | 296/19 |
| 5,991,947 | A | * | 11/1999 | Lavin et al. | 5/600 |
| 7,398,571 | B2 | | 7/2008 | Souke et al. | |
| 7,478,855 | B2 | | 1/2009 | Lambarth et al. | |
| 2004/0202533 | A1 | * | 10/2004 | Haire | 414/538 |
| 2006/0082176 | A1 | * | 4/2006 | Broadley et al. | 296/20 |

FOREIGN PATENT DOCUMENTS

WO    WO 94/28560    12/1994

OTHER PUBLICATIONS

PCT International Search Report mailed Jan. 22, 2009, for corresponding PCT Application No. PCT/US2008/068138.

* cited by examiner

*Primary Examiner*—Kiran B. Patel
(74) *Attorney, Agent, or Firm*—Van Dyke, Gardner, Linn & Burkhart, LLP (57) ABSTRACT

A patient support includes a base, a patient support surface supported by the base, an electrically powered device, and a rechargeable power storage device for powering the electrically powered device. Further, the patient support includes a receiving coil that is electrically coupled to the rechargeable power supply for inductive coupling with a transmitting coil, the receiving coil for recharging the rechargeable power supply when the receiving coil is inductively coupled to the transmitting coil.

11 Claims, 10 Drawing Sheets

POWERED PATIENT SUPPORT AND FASTENING SYSTEM WITH INDUCTIVE BASED POWER SYSTEM

CROSS-REFERENCE TO RELATED APPLICATION

This application claims priority from U.S. Pat. application Ser. 60/949,005, filed Jul. 11, 2007, entitled POWERED PATIENT SUPPORT AND FASTENING SYSTEM WITH INDUCTIVE BASED POWER SYSTEM, which is incorporated by reference herein in its entirety.

TECHNICAL FIELD AND BACKGROUND OF THE INVENTION

The present invention relates to a powered patient support and, more particularly, to a powered patient support, such as a powered ambulance cot, and a powered loading and unloading device for loading or unloading the patient support into an emergency vehicle, such as an ambulance.

SUMMARY OF THE INVENTION

The present invention provides a powered patient support and a powered loading and unloading device which are powered using an inductive based power system that allows onboard power supplies on the patient support and on the loading and unloading device to be recharged using wireless power transmission, which eliminates the need for direct electrical connections and reduces the concern for proper battery management.

In one form of the invention, a patient support includes a base, a patient support surface supported by the base, an electrically powered device at the support, and a rechargeable power storage device, such as a battery, for powering the electrically powered device. The support further includes a receiving coil electrically coupled to the rechargeable power supply for inductive coupling with a transmitting coil, which recharges the rechargeable power supply when the receiving coil is inductively coupled to the transmitting coil.

In one aspect, the electrically powered device comprises a driver. For example, the driver may comprise an elevation mechanism for inducing relative movement between the base and the patient support surface, for example an electrically powered elevation mechanism that raises the base relative to the patient support. Alternately, or in addition, the driver may be used in moving the patient support on a ground surface, for example.

In another aspect, a transmitting coil is provided that electrically couples to a power supply external to the patient support and inductively couples with the receiving coil so that the transmitting coil transmits power wirelessly to the receiving coil when the receiving coil is in close proximity to the transmitting coil and the transmitting coil is powered by the external power supply.

In a further aspect, the transmitting coil and the external power supply are mounted in a vehicle, such as an ambulance or other emergency vehicle. Further, the ambulance may include a cot fastening system, which is supported at the deck and which includes the transmitting coil. For example, the cot fastening system may comprise an antler cot fastening system or a cot loading and unloading device. The loading and unloading device may also incorporate a rechargeable power supply that is recharged wirelessly by the vehicle power supply.

In yet another aspect, the patient support comprises a cot, such as an ambulance cot or emergency stretcher.

In another form of the invention, an emergency vehicle is provided that includes a deck, a power supply, a transmitting circuit, which is electrically coupled to the power supply and includes a transmitting coil, and a cot fastening system, which is supported at the deck. The cot fastening system has a rechargeable power supply, such as a battery, and a receiving circuit electrically coupled to the rechargeable power supply for recharging the rechargeable power supply. The receiving circuit includes a receiving coil, which inductively couples with the transmitting coil when the transmitting coil is powered and the cot fastening system is in a predetermined configuration in the vehicle such that the transmitting coil wirelessly transmits power to the receiving coil to thereby recharge the rechargeable power supply of the cot fastening system.

In one aspect, the emergency vehicle comprises an ambulance.

In other aspects, the vehicle further includes a cot, such as an ambulance cot or emergency stretcher. The cot may also include a rechargeable power supply that is recharged using wireless power transmission. For example, the vehicle may include a second transmitting coil, and the rechargeable power supply of the cot may be electrically coupled to a receiving coil, which inductively couples to the second transmitting coil of the vehicle when the second transmitting coil is powered and, further, when the cot is loaded into the vehicle.

In a further aspect, the cot fastening system comprises a loading and unloading device with a movable arm movable between a retracted position within the emergency vehicle and an extended position wherein at least a portion of the arm is extended from the vehicle for receiving and engaging the cot. The movable arm includes the rechargeable power supply for selectively powering the driver, the receiving coil, and a driver. When powered, the transmitting coil inductively couples with the receiving coil when the arm is retracted into the vehicle wherein the receiving coil recharges the rechargeable power supply when the arm is retracted into the vehicle.

In a further aspect, the movable arm includes a pivotal arm portion, with the driver selectively raising or lowering the pivotal arm portion to engage or disengage from the cot. For example, the driver may be used to pivot the pivotal arm portion.

In another aspect, the deck includes a track, and the movable arm is movably mounted along the track. For example, the driver may be used to selectively move the movable arm along the track. In a further aspect, the arm is mounted to a trolley or carriage that is movably mounted along the track.

According to yet another form of the invention, an emergency vehicle includes a cot, which includes an onboard rechargeable power supply, such as a battery, and a recharging circuit electrically coupled to the onboard rechargeable power supply, a deck, a cot latch for securing the cot in the vehicle, and a power supply system. The vehicle further includes a power supply system, which inductively couples to the recharging circuit for recharging the rechargeable power supply when the cot is loaded onto the deck.

In one aspect, the vehicle further includes a loading and unloading device that provides the cot latch. In a further aspect, the loading and unloading device includes an onboard rechargeable power supply and a recharging circuit electrically coupled to the rechargeable power supply. In addition, when the loading and unloading device is in a preselected configuration, the power supply system of the vehicle inductively couples to the recharging circuit of the loading and unloading device for recharging the rechargeable power supply of the loading and unloading device.

In yet another aspect, the loading and unloading device includes an electrically driven device, with the onboard rechargeable power supply of the loading and unloading device selectively powering the electrically driven device. Further, the loading and unloading device may include a carriage or trolley with a pivotal arm portion, with the electrically driven device comprising a driver for moving the pivotal arm portion relative to the carriage.

According to another aspect, the cot includes an electrically driven device, with the onboard rechargeable power supply of the cot selectively powering the electrically driven device. For example, the electrically driven device may comprise a driver for selectively raising the base of the cot relative to the patient support surface to facilitate loading of the cot into the vehicle.

In any of the above inventions, a non-contact data transmission system may also be provided. For example, data may be wirelessly transmitted by induction between the receiving and transmitting coils of the respective circuits. Further, frequency-shift keying techniques may be used to minimize the disturbance on the power transmission.

In another form of the invention, a method of powering a patient support includes providing a patient support, mounting a rechargeable power supply at the patient support, providing a recharging circuit, and electrically coupling the recharging circuit to the rechargeable power supply. Further, the method includes wirelessly transmitting power to the recharging circuit to thereby recharge the rechargeable power supply at the patient support.

In one aspect, the method further includes providing a vehicle with a power supply, loading the patient support in the vehicle, and wirelessly transmitting power to the recharging circuit from the power supply of the vehicle when the patient support is loaded in the vehicle to thereby recharge the rechargeable power supply at the patient support.

In a further aspect, the patient support is loaded into the vehicle and is secured in the vehicle with a loading and unloading device, which has a rechargeable power supply electrically coupled to a recharging circuit. Power may also be wirelessly transmitted to the recharging circuit of the loading and unloading device from the power supply of the vehicle when the loading and unloading device is in a preselected configuration to thereby recharge the rechargeable power supply at the loading and unloading device.

In other aspects, the power supply of the vehicle includes a transmitting circuit and, further, a circuit for adjusting the resonant frequency of the transmitting circuit. In a further aspect, the resonant frequency of the transmitting circuit is adjusted to at least closely match the resonant frequency of the recharging circuit.

In yet another aspect, data may be inductively transmitting between the patient support or cot and the vehicle, for example between a data storage device on the patient support or cot and a data storage device on the vehicle. Further, data may be inductively transmitted to a data storage device in a handheld device or a data storage device in a hospital from the patient support or cot data storage device. Alternately, once transmitted to the vehicle data storage device, the data may then be transmitted to a data storage device at a hospital or to a data storage device on a handheld device.

According to yet another form of the invention, a method of powering a patient support fastening system includes providing a patient support fastening system, providing a rechargeable power supply at the patient support fastening system, providing a recharging circuit, electrically coupling the recharging circuit to the rechargeable power supply, and wirelessly transmitting power to the recharging circuit to thereby recharge the rechargeable power supply at the patient support fastening system.

In one aspect, the patient support fastening system is provided in a vehicle. Power is wirelessly transmitted to the recharging circuit from the power supply of the vehicle when the patient support fastening system is in a preselected configuration in the vehicle to thereby recharge the rechargeable power supply at the patient support fastening system.

In a further aspect, a cot is secured in the vehicle with the patient support fastening system. In addition, the cot may be loaded or unloaded with the patient support fastening system. Further, the cot may include a rechargeable power supply and a recharging circuit, which is electrically coupled to the rechargeable power supply for recharging the rechargeable power supply. Power may then be wirelessly transmitted to the recharging circuit of the cot from the power supply of the vehicle when the cot is in a preselected location in the vehicle.

Accordingly, the present invention provides a patient support with an onboard rechargeable power supply that that can be recharged without the need for direct electrical connection with an external power supply. Further, the patient support fastening system of the present invention may incorporate an onboard rechargeable power supply that also can be recharged without the need for direct electrical connection to an external power supply. Consequently, the present invention reduces the concern for battery management and also the need for precise alignment that is typically needed for direct electrical connections.

These and other advantages of the present invention will be apparent to one skilled in the art in light of the following written description and the accompanying drawings.

DETAILED DESCRIPTION OF THE INVENTION

Figure 1:
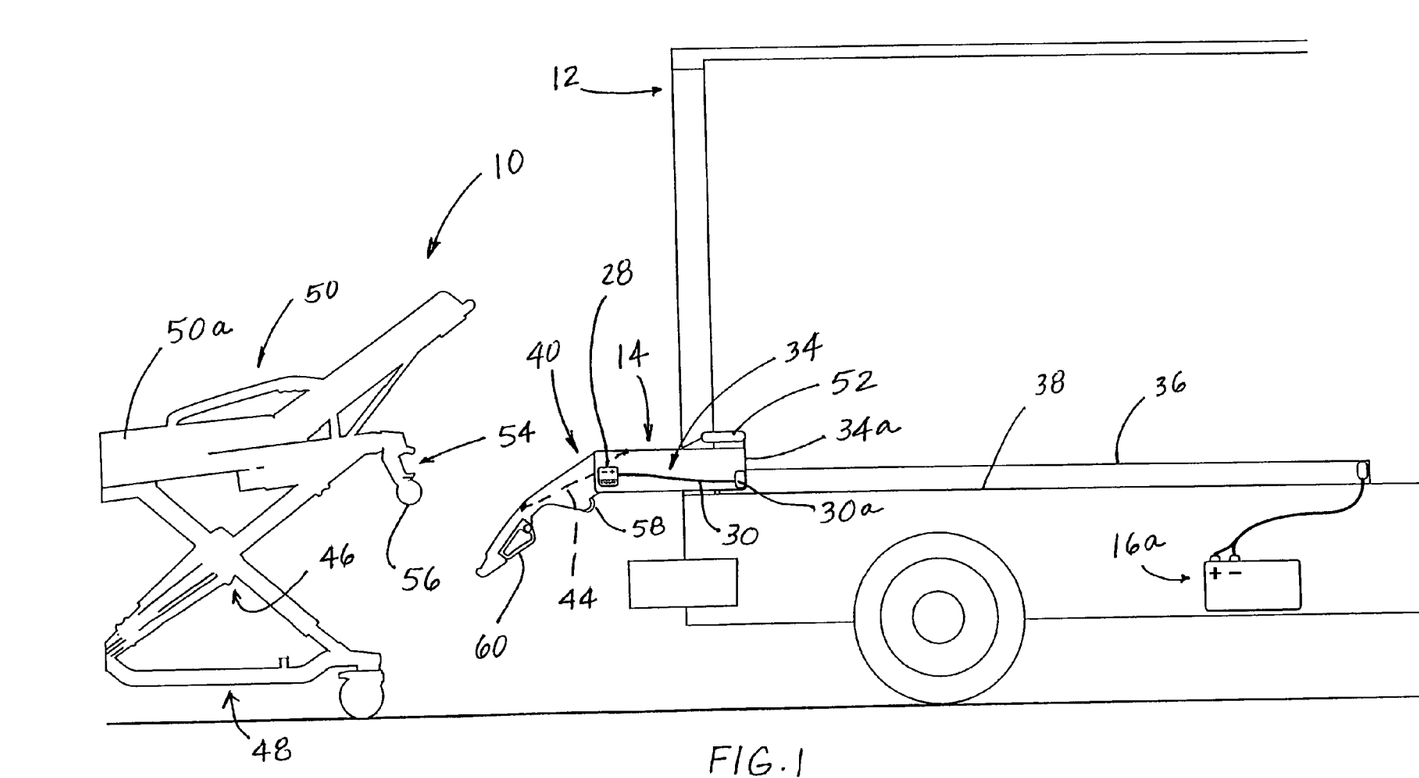
FIG. 1 is a fragmentary side elevation view of a patient support and emergency vehicle incorporating a loading and unloading device and, further, an induction based power supply system of the present invention.

Referring to FIG. 1, the numeral 10 generally designates a patient support of the present invention. In the illustrated embodiment, patient support 10 comprises a cot, such as an ambulance cot or emergency stretcher. For details of the overall structure of a suitable cot or stretcher that may incorporate the present invention, reference is made to U.S. Pat. Nos. 5,537,700; 6,125,485; 6,735,794; 7,100,224; WO 2004/064698; U.S. Patent Publication 2006/0075558, now U.S. Pat. No. 7,398,571, and copending U.S. patent application Ser. No. 10/542,232, now U.S. Pat. No. 7,478,855, for example, all commonly assigned to Stryker Corporation of Kalamazoo, Mich. and which are incorporated by reference in their entireties herein. As will be more fully described below, patient support 10 is secured in an emergency vehicle 12 by a cot or patient support fastening system. Further, each of the patient support 10 and the fastening system may include a rechargeable power supply, such as a rechargeable battery, that can be recharged by a power supply at the vehicle, including the vehicle's battery.

In the illustrated embodiment, the cot fastening system comprises a loading and unloading device 14 that loads patient support 10 into and unloads patient support 10 from the emergency vehicle, as well as fastens patient support 10 in the vehicle when patient support 10 is loaded into the vehicle. Additionally, an arresting device used in a cot fastening system, such as disclosed in U.S. Pat. No. 7,287,794, which is incorporated by reference herein its entirety, can be used to fasten the patient support in the vehicle. As will be more fully described below, when patient support 10 is fully loaded into the vehicle, the vehicle based power supply will recharge the rechargeable power supply of the patient support 10. Similarly, when the loading and unloading device (14) is in a preselected position in the vehicle, its rechargeable power supply will be recharged by the vehicle based power supply.

To charge the rechargeable power supplies, the vehicle incorporates an induction based power supply system 16. Although described in reference to an ambulance and an ambulance cot, it should be understood that the present invention has broader application, including to other patient supports, such as beds, infant incubators, or the like, and to other vehicles, including a helicopter. Further as previously noted, the vehicle based power supply may be the vehicle battery or another power supply provided in the vehicle.

Figure 2:
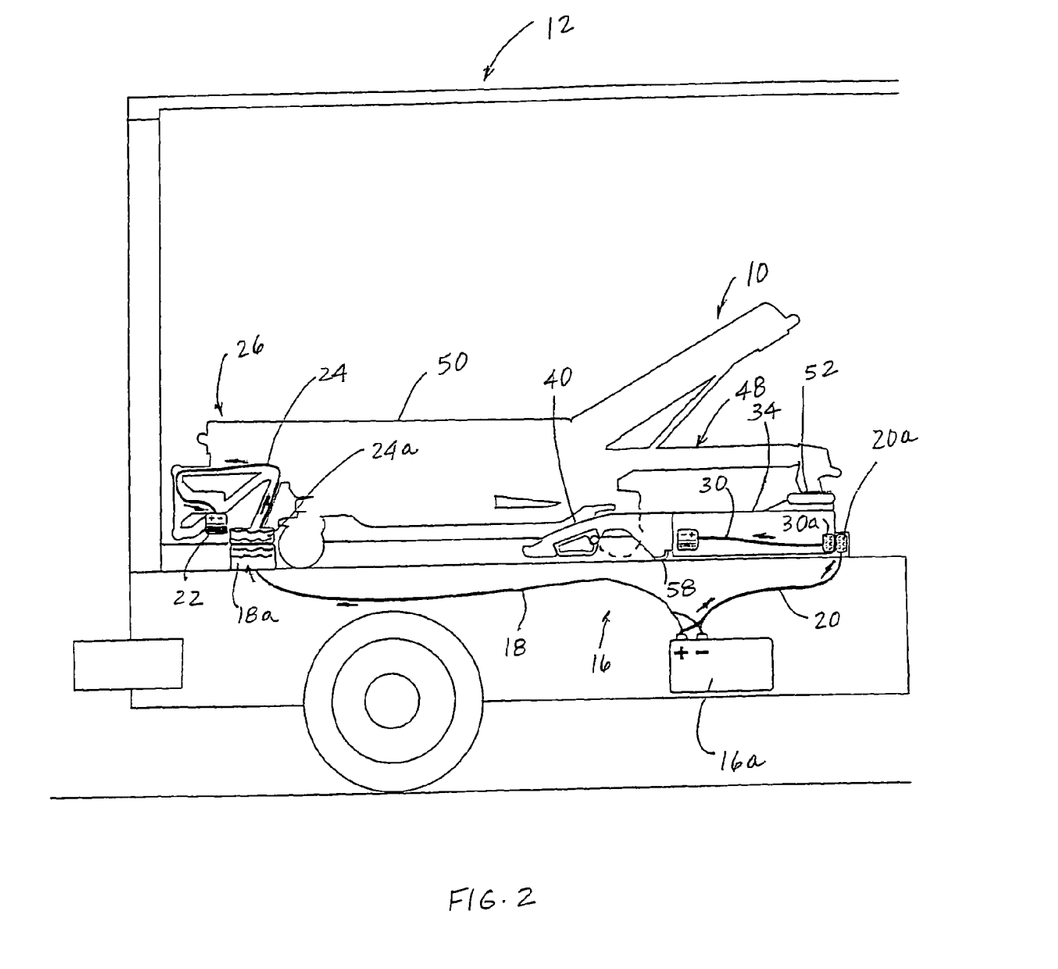
FIG. 2 is a side elevation view of the ambulance of FIG. 1 with the patient support loaded onto a vehicle.
Figure 3:
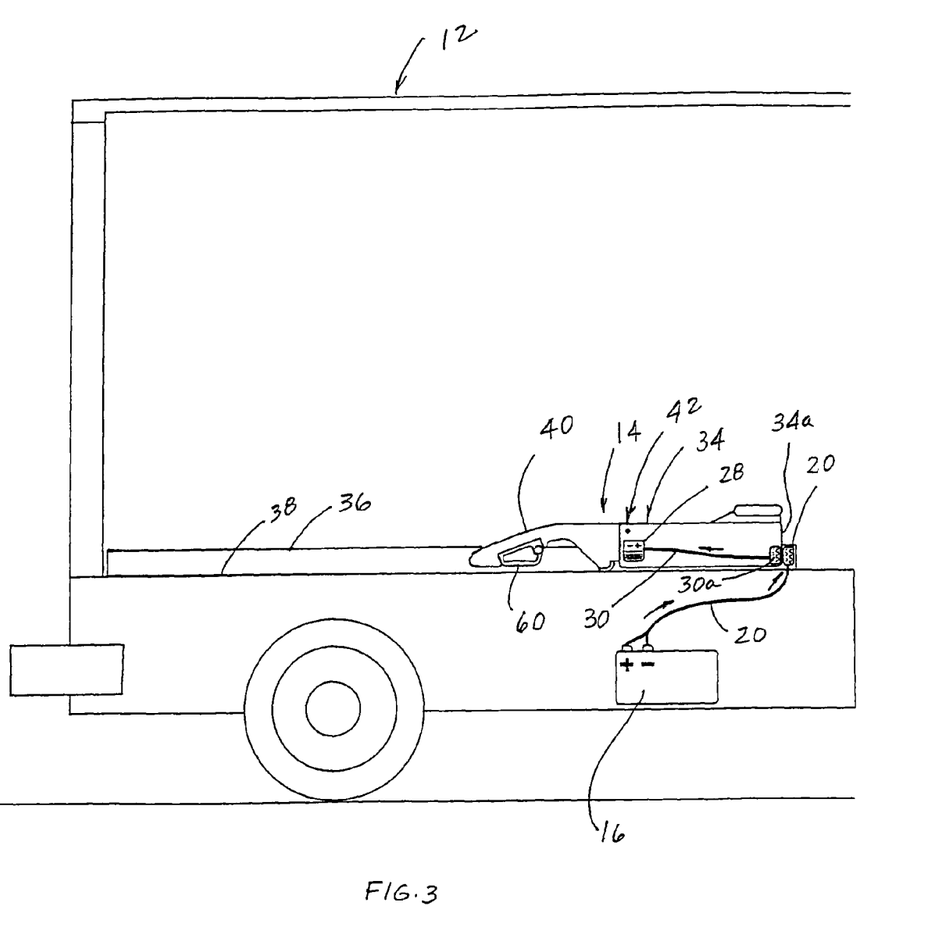
FIG. 3 is a similar view to FIG. 2 illustrating the loading and unloading device in a stowed position with the patient support removed for clarity.

Referring to FIGS. 2 and 3, induction based power supply system 16 includes a conventional DC power supply or source 16a, such as a battery, which is connected to two power supply circuits 18 and 20 for recharging the rechargeable power supplies on patient support 10 and on the loading and unloading device 14 through wireless power transmission, namely by inductive coupling. As best seen in FIG. 2, patient support 10 includes a patient support based rechargeable power supply or source 22 that is mounted to patient support 10 and, further, a patient support based power receiving or recharging circuit 24 that is electrically coupled to patient support based rechargeable power supply 22 for recharging power supply 22. As described below, patient support based recharging circuit 24 wirelessly receives power from a vehicle based power supply circuit 18 to thereby recharge patient support based rechargeable power supply 22.

As best understood from FIG. 2, power supply circuit 18 is coupled to vehicle based power supply 16a and includes a primary or transmitting coil 18a, which transmits power wirelessly to a secondary or receiving coil 24a of recharging circuit 24. In this manner, when electricity is passed through circuit 18 and the electricity passes through coil 18a, coil 18a will generate a magnetic field. The magnetic field in coil 18a will in turn induce a magnetic field in coil 24a when coil 24a is in close proximity to coil 18a, which will induce current flow in coil 24a and in turn in circuit 24, which is coupled to rechargeable power supply 22 to thereby recharge power supply 22.

In the illustrated embodiment, rechargeable power supply 22 and recharging circuit 24 are provided at the foot end 26 of patient support 10 and, further, such that receiving coil 24a is aligned with transmitting coil 18a when the patient support 10 is fully inserted or positioned in vehicle 12 by loading and unloading system 14. By providing a loading and unloading system 14 that loads the patient support 10 into a vehicle 12, the location of the patient support in the vehicle can be controlled such that its location when fully inserted is repeatable and, further, done in a manner to allow the transmitting and receiving coils to be closely aligned and/or in registry with each other to ensure the proper physical positioning of the respective coils, which will reduce the power loss in the wireless transfer of power and optimize the inductive coupling efficiency.

Referring to FIG. 3, as noted above, loading and unloading device 14 includes a loading and unloading device based rechargeable power supply 28, such as a battery, and a loading and unloading device based receiving or recharging circuit 30 that is electrically coupled to loading and unloading device based rechargeable power supply 28, which similarly receives power from power supply 16a through power supply circuit 20. Receiving circuit 30 also includes a receiving coil 30a, which receives power from transmitting coil 20a of power supply circuit 20 when the loading and unloading device is positioned in its fully retracted or inserted position within the vehicle and coil 30a is aligned with coil 20a.

Again referring to FIG. 3, loading and unloading device 14 includes a carriage or trolley 34, which is mounted on one or more tracks or rails 36, which are in turn mounted to the deck 38 of vehicle 12. Carriage 34 is movably mounted to tracks or rails 36 by a pair of guides (not shown). For example, where the tracks or rails are tubular, guides 36 may comprise sleeves, such as described in PCT/US2004/001070 published under WO 2004/064698. In the illustrated embodiment, carriage 34 is configured to engage and releasably couple to the head end of patient support 10 so that patient support 10 may be guided into vehicle 10 by loading and unloading device 14 either manually or pulled into the vehicle by a driver, noted below.

Mounted to carriage 34 is an arm 40, which is adapted to lift the head end of the patient support to allow an attendant to guide patient support 10 onto carriage 34 to couple the patient support to carriage 34 so that when carriage 34 is pushed or retracted into the vehicle, patient support 10 will be guided into the vehicle. Arm 40 comprises a generally U-shaped member with two arm portions and a transverse member, with the two arm portions pivotally mounted at their distal or proximate their distal ends to carriage 34.

As best understood from FIG. 1, arm 40 is pivotally mounted to carriage 34 by an axle or pin 42, which extends through the respective ends of the arm portions and carriage 34 to permit arm 40 to move between a generally horizontal position, such as shown in FIG. 3, and a downwardly angled or lowered position, such as shown in FIG. 1, so that patient support 10 can be guided onto arm 40. Pin 42 may be extended through bushings mounted in carriage 34 and held in place by conventional mechanisms, such as retaining rings or cotter pins or the like.

Arm 40 is moved between its generally horizontal position and lowered position by driver 44, such as a linear actuator, including a hydraulic cylinder, which is mounted at one end in carriage 34 and at its opposed end to arm 40. When the linear actuator is extended, arm 40 is moved to its generally horizontal orientation, and when the linear actuator is contracted arm 40 moves to its lowered position to receive patient support 10. Driver 44 is electrically coupled to and powered by rechargeable power supply 28, which as noted above is recharged when loading and unloading device 14 is fully retracted into the vehicle.

As best seen in FIGS. 2 and 3, receiving coil 30a is mounted to the leading end of carriage 34, while transmitting coil 20a is located at or near the proximate end of track 36 so that receiving coil 30a will align with and be in close proximity to coil 20a when carriage 34 is fully retracted on the tracks into the vehicle. In this manner, when carriage 34 is fully retracted into the vehicle and coil 20a is energized, its magnetic field will generate a magnetic field in coil 30a to thereby wirelessly transmit power to recharging circuit 30 and, hence, can recharge rechargeable power supply 28.

Similarly, patient support 10 includes an electrically powered device 46 that is powered by rechargeable power supply 22. In the illustrated embodiment, the electrically powered device is a driver, namely an elevation mechanism, for raising the base 48 of patient support 10 relative to the patient support surface 50, which in a cot is referred to as a litter, so that patient support 10 can be configured in a more compact configuration when being loaded into vehicle 12.

In the illustrated embodiment, carriage 34 include a releasable latch 52 which is configured to engage the guide wheel support 54 of patient support 10, which is mounted to the head end of patient support 10. For example, a suitable latching device is described in U.S. Pat. No. 6,796,757, which is commonly assigned to Stryker Corporation of Kalamazoo, Mich. and is incorporated by reference in its entirety herein. Guide wheel support 54 supports a wheel or bearing 56 that supports the head end of the patient support 10 on the vehicle deck when patient support 10 is inserted into the vehicle, as would be understood by those skilled in the art. Similarly, arm 40 may include a guide wheel 58, which rides on deck 38 to support arm 40 when arm 40 is in its horizontal orientation. Further, to facilitate manual removal or retraction of the patient support from the vehicle, arm 40 may also include a handle 60 at or proximate its distal end.

Again referring to FIG. 2, coil 24a is located beneath patient support surface 50a of patient support 10 and, as previously noted, at the foot end 26 of patient support 10. Further, coil 24a is positioned so that when patient support 10 is fully inserted into the vehicle and carriage 34 is fully retracted in the vehicle along track or tracks 36, coil 24a will align and be in registry and/or close proximity to coil 18a, which is supported adjacent track 36 on deck 38. In this manner, when the patient support is fully inserted in the vehicle both receiving coils (24a and 30a) will align and be in registry and/or close proximity to the respective transmitting coils (18a and 20a).

Alternately or in addition, either circuit 20 or 30 and 18 or 24 may include an impedance matching circuit to improve the resonant frequency match between the respective circuits, which will improve transmission and hence efficiency of the power transmission, as known to those skilled in the art. For example, the impedance matching circuit may include feedback loops that check the resonance of the power supply circuit (18, 20) and of the receiving circuit (24, 30) so the impedance of the power supply circuit can be adjusted. The feedback loop(s) may provide a dynamic circuit that seeks resonance between the two circuits. As a result, the power circuit can automatically adjust the frequency of the applied current to the transmitting coil to maintain the frequency resonant with the frequency of the receiving circuit, such as described in EP0700574B1, which is incorporated by reference herein in its entirety.

In addition to power transmission, coil 24a may be used to wirelessly transmit data from patient support 10 to vehicle 12 through induction. For example, modulated data signals may be transmitted to coil 24a, which can then wirelessly transmit the data signal to the receiving coil using induction, in this case coil 18a, which generates a reception signal. The reception signal is then demodulated by a demodulator. The demodulator then may transmit the signal to a processor or storage device, where it can be processed or stored for later use.

For example, power management data may be transmitted from patient support 10 to vehicle 12. Patient support 10 may include a storage device, for example, for storing data relative to the charging and using of rechargeable power supply 22. This data may be stored on the power supply or battery or on the charger. Power management data may include, for example, the number of times the battery is charged and the length of use of the battery, which data may be processed for evaluation or stored for later evaluation. Therefore, in this application, the receiving coil at the patient support becomes a transmitting coil for transmitting the data to a receiving coil, for example coil 18a, which then becomes a receiving coil.

Other data that may be transmitted includes the identification of the patient support or data related to the patient. For example, the patient support may incorporate an RFID tag, which identifies the type of patient support, and an RFID reader may be provided on the loading and unloading device so that the loader will recognize the patient support and, for example, know when to actuate the linear actuator to lift the head end of the patient support and how high, for example. Similarly, the identification of the patient support may be transmitted to the vehicle using data transmission by induction rather than RF transmission in a similar manner noted above.

Patient data that may be transmitted may include patient weight. For example, patient support 10 may incorporate load cells, which are coupled to an onboard processor that determines the weight of the patient based in the signals from the load cells. This data may be displayed at the patient support, for example, by a LCD display or other types of displays, so that the EMS personnel can determine the correct dosage of a medicine or treatment for example. This data similarly can be transmitted from patient support 10 to the storage device on the vehicle, which data can then be stored or processed for later use.

Alternately or in addition, the data may be inductively transmitted to a storage device on a handheld device (e.g. for an EMT or for EMS services) that includes a receiving coil that is in communication with the data storage device in the handheld device.

Further, the data in the storage device in either the vehicle or the handheld device may be transmitted, for example, wirelessly to a hospital storage device, including to a patient database. In addition, the transmission of the data may be made directly between the patient support coil (24a) and a hospital receiving coil when the patient support is delivered to the hospital, with the hospital receiving coil in communication with the hospital storage device.

When data transmission is also provided, frequency-shift keying techniques may be used to minimize the disturbance on the power transmission, such as described in EP0700574B1.

In addition or alternately to drivers 44 and 46, other drivers and/or other electrically power devices may be powered by rechargeable power supplies 22 and 28. For example, loading and unloading device 14 may incorporate a driver to move carriage relative to the tracks under power to thereby pull or push the patient support relative to the deck. Further, patient support 10 may include a fifth wheel to power the patient support, which may also be powered by rechargeable power supply 22 when patient support 10 is being maneuvered through a hospital or at an accident site or the like. Further, electrically powered accessories mounted at patient support 10 may also be powered by rechargeable power supply 22. It can be appreciated that the power demand on the rechargeable power supply 22 can be significant; hence, the inductive recharging system of the present invention may significantly prolong the life of the power supply 22, as well as, power supply 28. Moreover, by eliminating the electrical connections, no direct physical contact between the two electrical circuits occurs, which reduces the risk of electrical shock to the patient or the caregiver. In addition, with electrical connectors, repetitive coupling and decoupling can cause wear and tear on the connections. Further, electrical connections require greater precision in the alignment between the connectors.

As noted above, patient support 10 may be secured in the vehicle using other fastening systems. Referring to FIGS. 4-9, another embodiment of a patient support or cot fastening system is illustrated, which comprises a loading and unloading device 114 that is of similar construction to loading and unloading device 14 of the first embodiment and may incorporate a loading and unloading device based rechargeable power supply and loading and unloading device based recharging circuit described in reference to the first embodiment. For further details of the loading and unloading device based rechargeable power supply and loading and unloading device based recharging circuit reference is therefore made to the previous embodiment.

Device 114 includes a carriage or trolley 134 that is mounted on track 136, which is in turn mounted to the deck 138 of a vehicle. In the illustrated embodiment, track 136 comprises a rectangular tubular track with opposed guide surfaces 136a for guiding carriage 134. Carriage 134 is movably mounted on track 136 for linear movement along track 136 by an intermediate elongate member 135, such as an inverted, generally channel-shaped member. Intermediate member 135 includes a plurality of bearing assemblies 135a, for example a plurality of vertically oriented rollers, that engage sides 136a of track 136 and guide member 135, as well as carriage 134, along track 136. The rollers or bearings are mounted in member 135 between upper and lower inwardly extending flanges by fasteners 135b. Intermediate elongate member 135 also includes a second plurality of bearings 135c, such as wheels or rollers, mounted in the channel-shaped member for engaging deck 138 to thereby provide vertical support to member 135 and carriage 134 as they moves along track 136.

Carriage 134 similarly comprises an inverted, generally channel-shaped member and also includes a plurality of bearing assemblies 134a, which are similarly secured between inwardly extending flanges by fasteners 134b and that engage opposed sides 135d of member 135 so that carriage 134 is movably mounted to member 135. In this manner, carriage 134 and member 135 form a nested rail arrangement in which member 135 can be extended from track 136, and carriage 134 can be extended from member 135 beyond the end of track 136 to extend carriage 134 further from the vehicle, for example, than the first embodiment.

Figure 4:
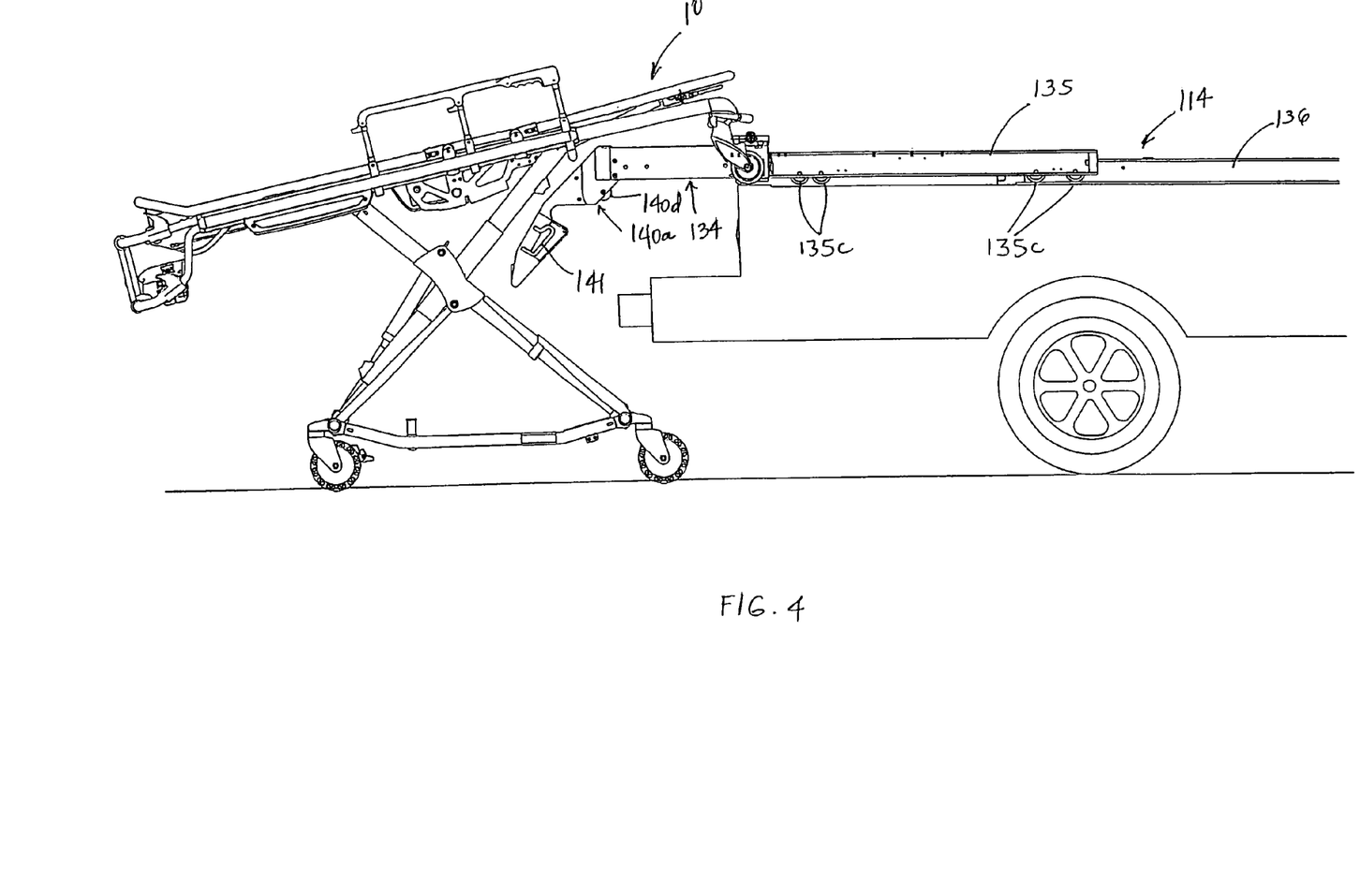
FIG. 4 is a similar view to FIG. 1 illustrating another embodiment of a loading and unloading device of the present invention.
Figure 5:
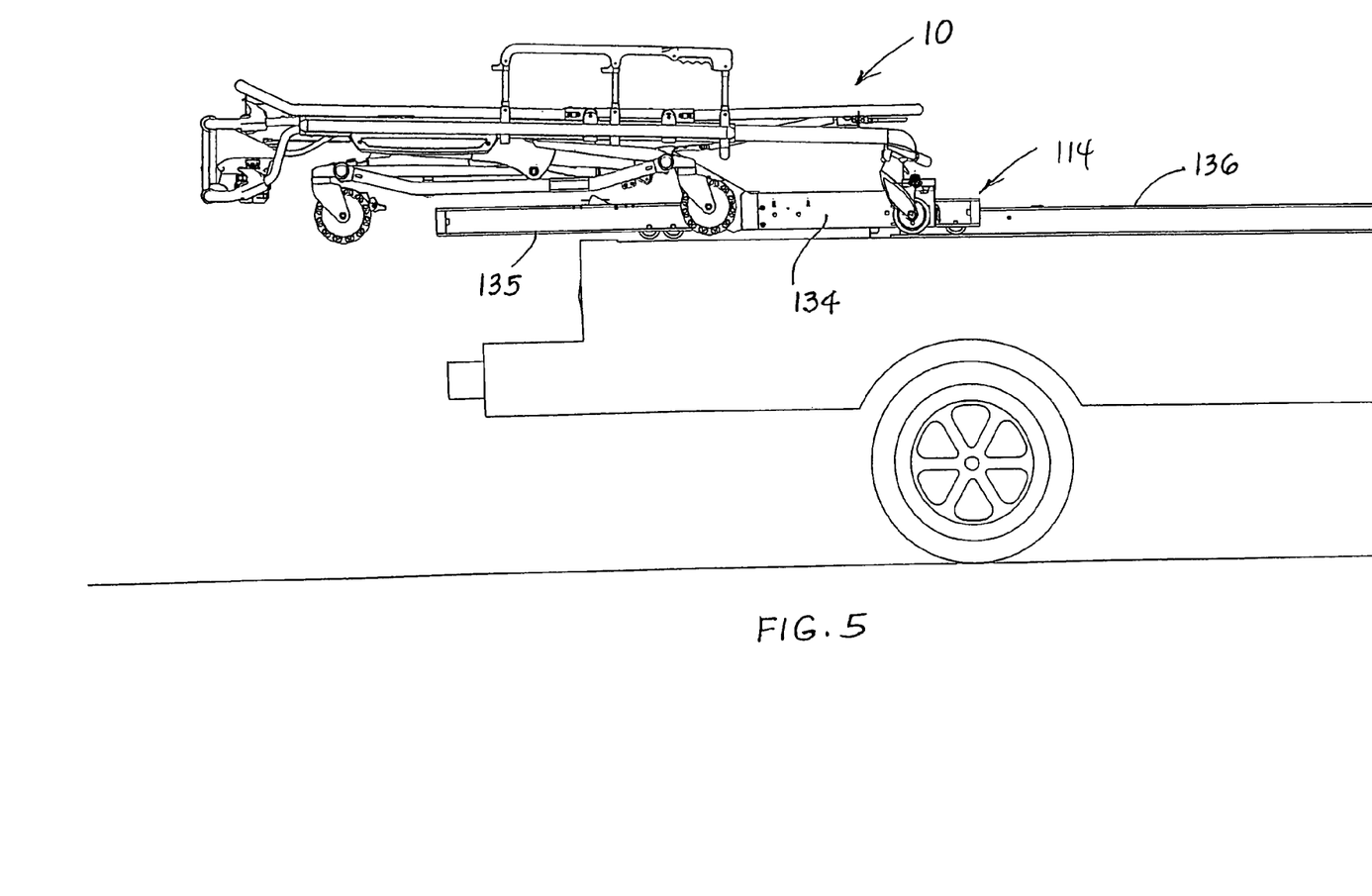
FIG. 5 is a side elevation view of the patient support being loaded into a vehicle.
Figure 6:
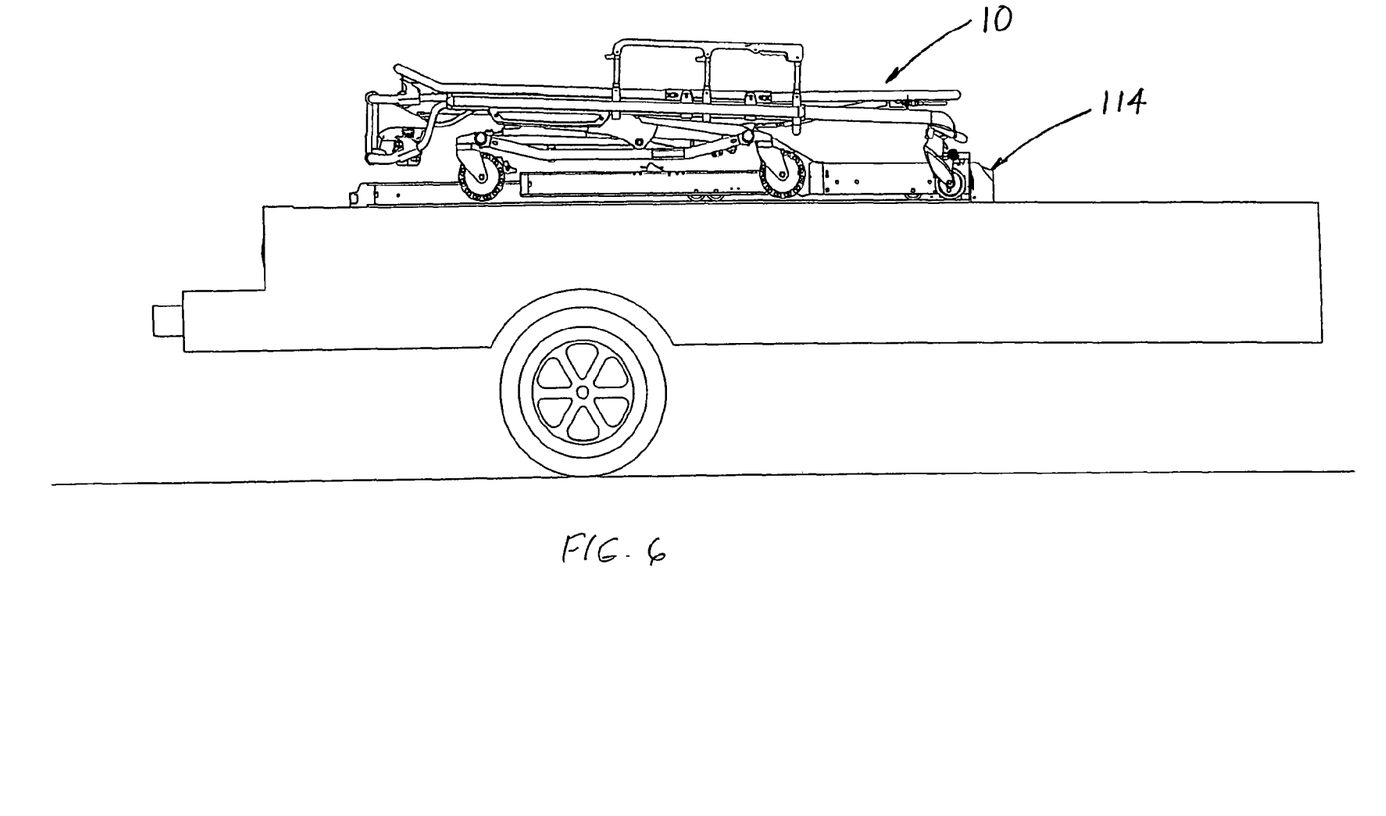
FIG. 6 is a side elevation view of the patient support in a fully stowed position within the vehicle.
Figure 7:
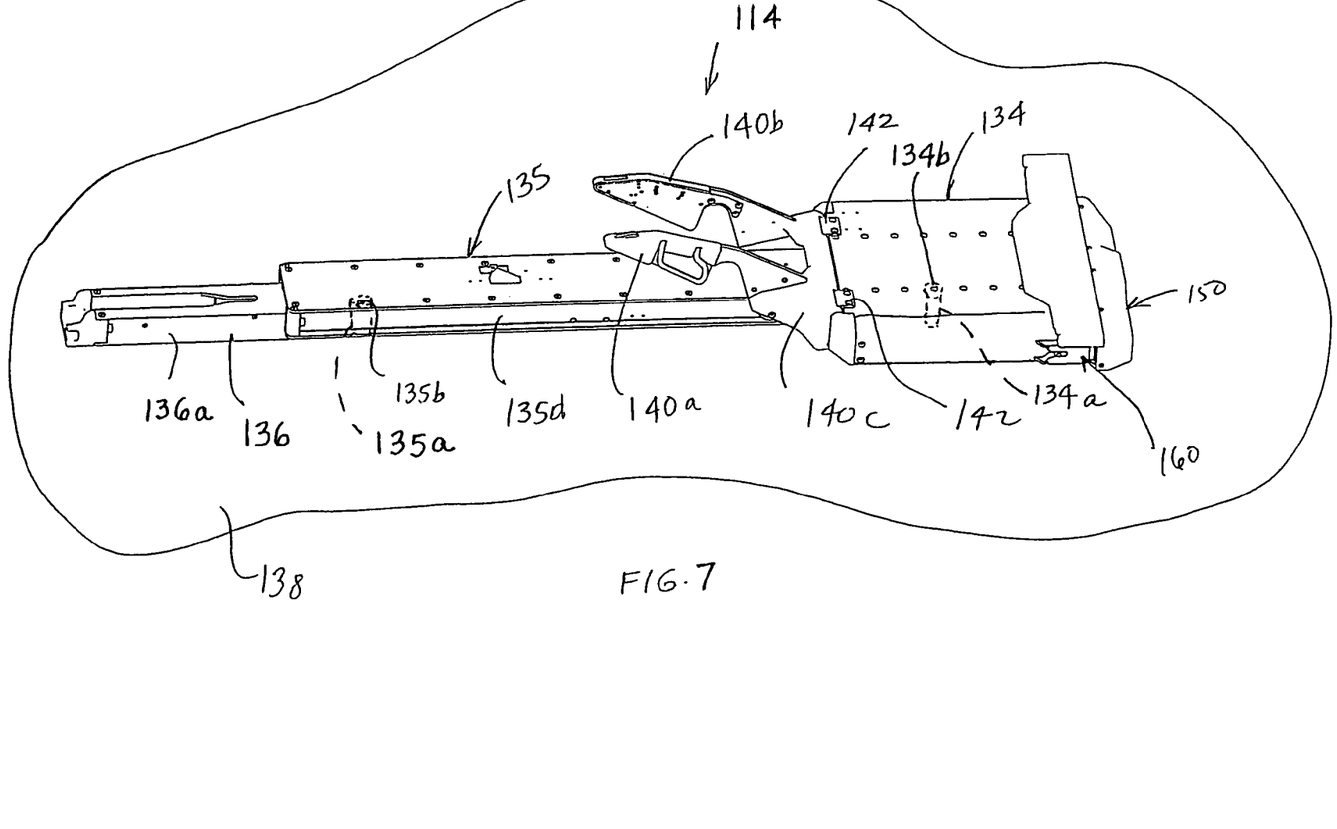
FIG. 7 is a perspective view of the loading and unloading device of FIG. 4.

Similar to device 14, device 114 includes a pair of pivotal arms 140a and 140b, which are pivotally mounted to carriage 134 and which are moved between a raised or inclined position, shown for example in FIG. 7, and a lowered position shown in FIG. 4 when carriage 134 is fully extended from the vehicle for loading or unloading patient support 10 into or from the vehicle. In the illustrated embodiment, arms 140a and 140b are commonly mounted to or formed on a base 140c, which is pivotally mounted to carriage 134 by a pair of hinges 142. Base 140c optionally includes one or more bearings or rollers 140d, which support base 140a on deck 138 when carriage 134 is retracted into the vehicle. To facilitate handling of carriage 134, arms 140a and 140b also optionally include handles 141 similar to the previous embodiment.

Arms 140a and 140b are pivoted by at least one actuator housed in carriage 134, which is mounted on one end to base 140c and mounted at its other end to carriage 134. Thus when the actuator is contacted, arms 140a and 140b will be lowered relative to carriage 134, and when the actuator is extended the arms will be raised back to their raised or inclined position illustrated in FIG. 7. Thus, loading and unloading device 114 operates in a similar manner as device 14 but has an extended range of motion.

Figure 8:
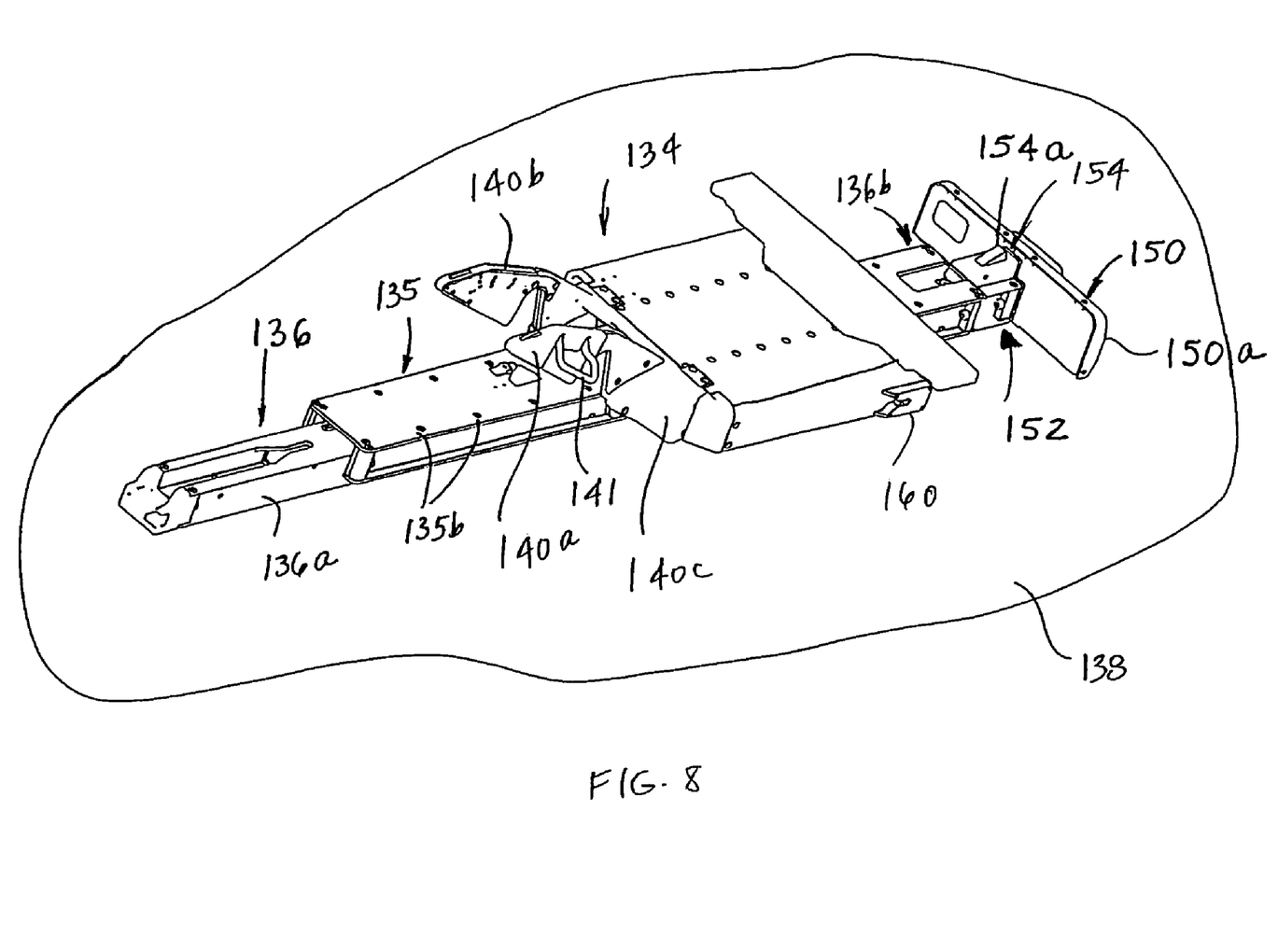
FIG. 8 is another perspective view of the loading and unloading device of FIG. 4 showing the carriage and pivotal arms moved away from the fully stowed position.

As best seen in FIG. 8, at the proximate terminal end 136b of track 136, device 114 includes a stop assembly 150. Stop assembly 150 is secured to deck 138 at the terminal end of track 136 and extends transversely relative to track 136 so that when carriage 134 is fully retracted into the vehicle, carriage 134 will be in close proximity if not abut stop assembly 150. Optionally, stop assembly 150 may comprise a housing 150a formed from a member having a similar cross-section to carriage 134, e.g. an inverted channel shaped member, so that when carriage 134 is fully inserted into the vehicle along track 136 the two members forming the carriage and the stop assembly will abut each other and have a shared geometry, which facilitates the mounting of the respective coils for the inductive power supply system. In this manner, stop assembly 150 may house the transmitting circuit described in reference to the previous embodiment in housing 150a. In addition, stop assembly 150 optionally includes a projecting stop member 152, which is aligned with member 135 so that member 135 will be spaced from stop assembly 150 when fully retracted along track 136, though carriage 134 will be in close proximity if not abut housing 150a. In addition, stop assembly 150 also may include a locking mechanism 154 that includes a spring biased latch 154a with a switch, which is located such that carriage 134 will initially compress the latch and close the switch, when carriage 134 is retracted and moved toward the stop assembly housing 150a, but once fully retracted will allow the latch to return to its pre-compressed position and engage carriage 134. Thus, when carriage 134 and arms 140 are in their fully retracted position along track 136, latch 154a will engage carriage 134 to thereby locking the carriage 134 and arms 140 in their fully retracted position. The switch may be used to trigger the recharging of the rechargeable power supply located in carriage 134 and/or provide a signal of when the loading device is in its retracted position in the vehicle.

Similar to device 14, the rechargeable power supply located in carriage 134 may be used to power the actuator that raises or lowers arms 140a and 140b. In addition, carriage 134 may include a driver to move carriage 134 relative to member 135 and/or relative to track 136, which may also be powered by the carriage's on board rechargeable power supply.

Figure 9:
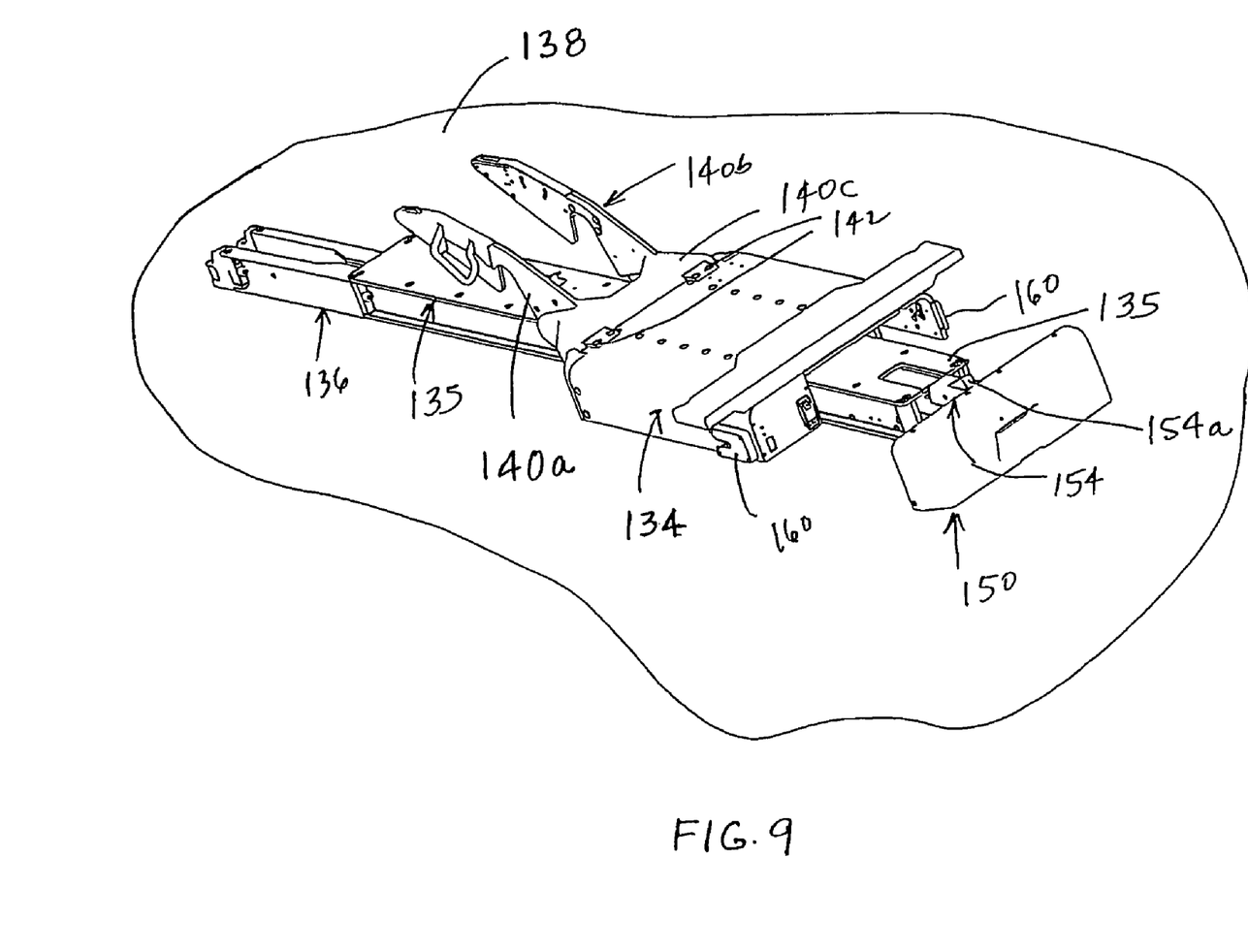
FIG. 9 is yet another perspective view of the loading and unloading device of FIG. 4.

To secure the patient support 10 to loading and unloading device 114, loading and unloading device 114 similarly includes at least one latch 160 for fastening the patient support 10 to carriage 134. Referring to FIG. 7-9, latches 160 are mounted to the opposed sides of carriage 134, which are adapted to releasably engage the head end wheel or bearing supports, described in reference to the first embodiment, which are mounted to the head end of the patient support 10 to facilitate loading of the patient support into the vehicle.

Figure 10:
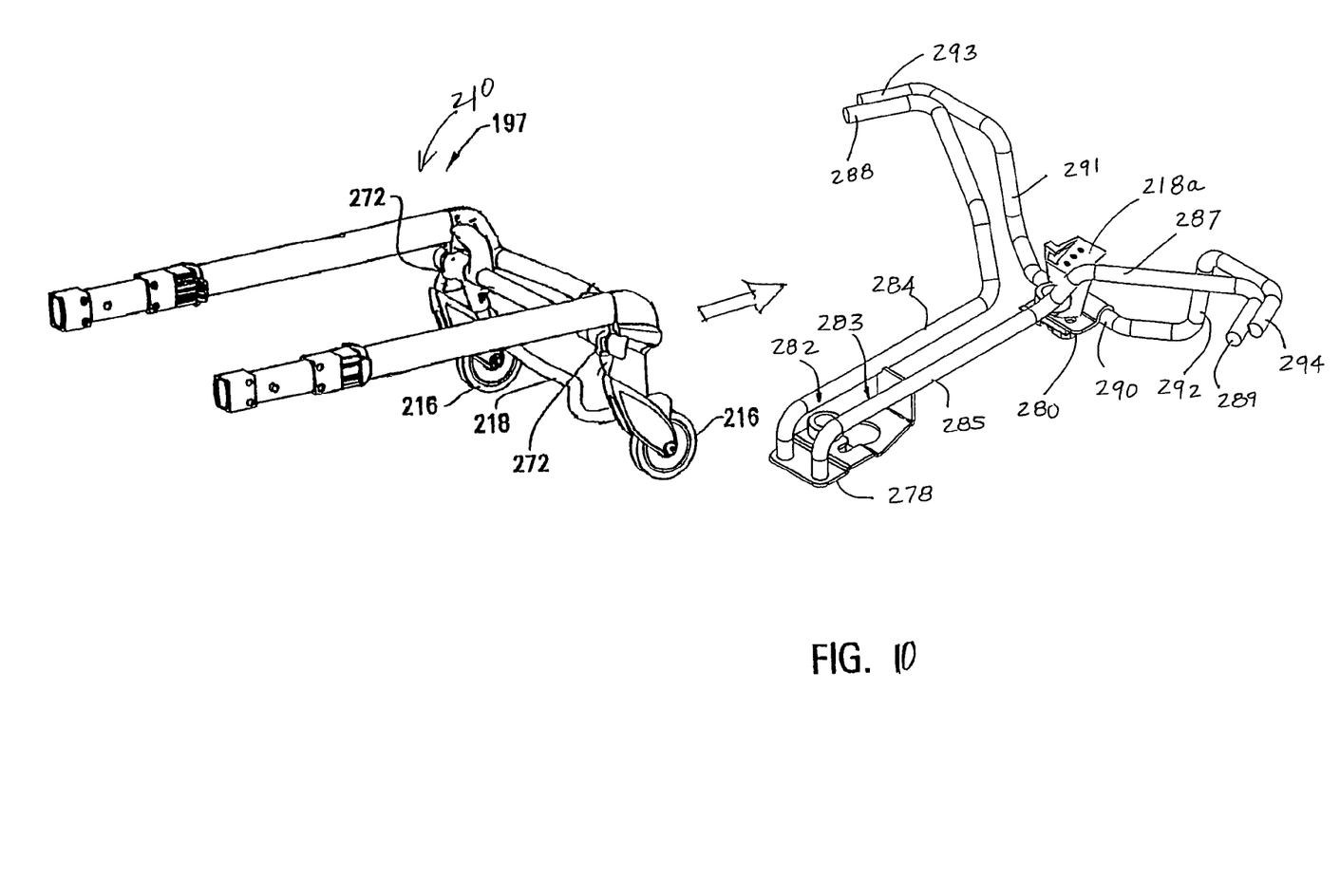
FIG. 10 is a perspective view of another embodiment of a cot fastening system of the present invention.

Referring to FIG. 10, another embodiment of the cot fastening system 214 for securing a patient support 210 is illustrated. Cot fastening system 214 comprises an "antler" system with a center yoke 278 and a forward yoke 280. Both yokes 278, 280 are mounted to the ambulance cargo area floor, with a centerline of the antler system 214 aligned in the fore-aft direction of the ambulance.

The center yoke 278 is formed from two rods 282, 283 arranged as mirror images about the centerline of the antler system 276. Each rod 282, 283 includes a longitudinal segment 284, 285 and an outwardly divergent segment 286, 287, each outwardly divergent segment 286, 287 rising to a rearwardly directed hook or "ear" 288, 289.

The forward yoke 280 includes a central segment 290 secured to the ambulance cargo floor and two outwardly divergent arms 291, 292. The arms each terminate in an "ear" 293, 294 that is joined with a respective ear 288, 289 of the center yoke 278.

Positioned at central segment 290 is a vehicle based transmitting circuit and vehicle based transmitting coil 218a, which are electrically coupled to a vehicle based power supply, such as a battery on the vehicle, for wirelessly transmitting power to a patient support based rechargeable power supply on support 210. Similar to support 10, support 210 optionally includes a patient support based rechargeable power supply and a patient support based recharging circuit that is electrically coupled to the patient support based rechargeable power supply. In the illustrated embodiment, the patient support based rechargeable power supply and recharging circuit are located at the head end of the patient support 210 so that when patient support 210 is fully loaded into the vehicle, the patient support based recharging circuit receiving coil will be aligned with central segment 290 and further with vehicle based transmitting coil 218a of the vehicle based transmitting circuit.

As patient support 210 (only the retractable head section 197 of support 210 is shown) is rolled into the vehicle head end first, as shown by the arrow in FIG. 10, safety bar 218 of support 210 contacts the center yoke 278. As the support 210 is rolled further, the center yoke 278 forces the safety bar 218 rearwardly until the safety bar 218 rides on top of the longitudinal segments 284, 285 of the rods 282, 283 of the center yoke 278. Again referring to FIG. 10, the latch disabler (illustrated and described more fully in publication US 2006/0075558, which is incorporated by reference herein in its entirety) on support 210 is activated prior to stop 272 reaching the shaft (numbered 266 in US 2006/0075558). This enables use of the support 210 with an antler system having a lower profile, while still activating the latch disabler. With the safety bar 218 in the rotated position, the latch disabler is activated, thereby locking the retractable head section 197 of support 210 in the extended position. The latch disabler will remain activated until the support 210 is removed from antler system 276. As the patient support 210 is pushed further forward, the fixed wheels 216 roll between the ears 288, 289 and 293, 294 of the center and forward yokes 278, 280 and into the antler system 276.

In this manner, when support 210 is fully retracted onto system 214 and preferably locked in its locked position, the receiving coil of the patient support based recharging circuit for the patient support based rechargeable power supply of support 210 is positioned in close proximity to transmitting coil 218a of antler system 214 so that the patient support based rechargeable power supply of support 210 can be charged using wireless power transmission from the antler system. For further details of antler system 214 and support 210 reference is made to US 2006/0075558 referenced above.

Accordingly, the present invention provides a power system that eliminates the need for direct electrical connectors and reduces the concern for battery management, while enhancing safety. Further, the loading and unloading device of the present invention may provide a greater range of motion and extension from the vehicle than heretofore known to further facilitate the loading and unloading of the patient support from a vehicle equipped with the loading and unloading device.

While the present invention has been described herein in reference to several embodiments illustrated in the attached drawings, it will be understood by those skilled in the art that the present invention can be modified to include any and all variations that are within the spirit and scope of the following claims. Further features of one embodiment may be combined with features of another embodiment. In addition, although described in reference to an electrically powered patient support or cot, the present invention may be used with a manually powered cot with or without any electrically powered devices. Further, while described in reference to the loading and unloading systems and antler system depicted in the figures, other cot fasteners or fastening systems may be used in conjunction with the present invention, including, for example the fastening system disclosed in U.S. Pat. No. 7,287,794, which is incorporated by reference in its entirety herein.

We claim:

1. A method of powering a patient support in vehicle comprising:
   providing a patient support;
   mounting a patient support based rechargeable power supply at the patient support;
   providing a patient support based recharging circuit;
   electrically coupling the patient support based recharging circuit to the patient support based rechargeable power supply; and
   wirelessly transmitting power to the patient support based recharging circuit to thereby recharge the patient support based rechargeable power supply at the patient support.

2. The method according to claim 1,
   providing a patient support fastening system;
   mounting a vehicle based transmitting circuit in a vehicle; and
   wirelessly transmitting power to the patient support based recharging circuit from the vehicle based transmitting circuit when the patient support is loaded into the vehicle and at the patient support fastening system to thereby recharge the patient support based rechargeable power supply at the patient support.

3. The method according to claim 2, further comprising generating data at the patient support, and inductively transmitting the data off the patient support.

4. The method according to claim 3, wherein said inductively transmitting the data includes inductively transmitting the data to the vehicle.

5. The method according to claim 2, further comprising providing the vehicle with a vehicle based power supply, locating the patient support fastening system in the vehicle, and wirelessly transmitting power to the patient support based recharging circuit from the vehicle based power supply of the vehicle through the vehicle based transmitting circuit when the patient support is in a selected position in the vehicle to thereby recharge the patient support based rechargeable power supply at the patient support.

6. The method according to claim 5, further comprising wirelessly transmitting power to the patient support based recharging circuit when the patient support is secured in the vehicle with the patient support fastening system.

7. The method of powering a patient support fastening system according to claim 2, further comprising selectively loading or unloading the patient support with the patient support fastening system.

8. The method of powering a patient support according to claim 1, further comprising providing a vehicle with a vehicle based power supply, loading the patient support in the vehicle, and wirelessly transmitting power to the patient support based recharging circuit from the vehicle based power supply of the vehicle when the patient support is loaded in the vehicle to thereby recharge the patient support based rechargeable power supply at the patient support.

9. The method of powering a patient support according to claim 8, further comprising loading the patient support in the vehicle with a loading and unloading device, the loading and unloading device having a loading and unloading device based rechargeable power supply electrically coupled to a loading and unloading device based recharging circuit, and further wirelessly transmitting power to the loading and unloading device based recharging circuit of the loading and unloading device from the vehicle based power supply of the vehicle when the loading and unloading device is in a preselected configuration to thereby recharge the loading and unloading device based rechargeable power supply at the loading and unloading device.

10. The method according to claim 1, further comprising generating data at the patient support, and inductively transmitting the data off the patient support.

11. The method according to claim 10, wherein said inductively transmitting the data includes inductively transmitting the data to a handheld device.

\* \* \* \* \*